United States Patent
Somers

[19]

[11] Patent Number: 6,147,179
[45] Date of Patent: *Nov. 14, 2000

[54] MONOLAYER FILM

[75] Inventor: Marc Stacey Somers, Longview, Tex.

[73] Assignee: Eastman Chemical Company, Kingsport, Tenn.

[*] Notice: This patent is subject to a terminal disclaimer.

[21] Appl. No.: 09/104,726

[22] Filed: Jun. 25, 1998

Related U.S. Application Data

[60] Provisional application No. 60/050,768, Jun. 25, 1997.

[51] Int. Cl.⁷ .................................... C08F 210/18
[52] U.S. Cl. .................... 526/348; 526/351; 526/352; 526/348.5; 526/348.1; 525/240
[58] Field of Search ................ 526/348, 348.1, 526/352, 351, 348.5; 525/240

[56] References Cited

U.S. PATENT DOCUMENTS

| | | | |
|---|---|---|---|
| 3,700,753 | 10/1972 | Terada et al. ........................ | 525/88 |
| 4,123,417 | 10/1978 | Finberg et al. . | |
| 4,275,119 | 6/1981 | Weiner . | |
| 4,291,092 | 9/1981 | Weiner . | |
| 4,339,496 | 7/1982 | Weiner . | |
| 4,339,498 | 7/1982 | Weiner . | |
| 4,340,640 | 7/1982 | Weiner . | |
| 4,340,641 | 7/1982 | Weiner . | |
| 4,348,455 | 9/1982 | Clayton . | |
| 4,367,256 | 1/1983 | Biel . | |
| 4,399,180 | 8/1983 | Briggs et al. . | |
| 4,418,114 | 11/1983 | Briggs et al. . | |
| 4,430,457 | 2/1984 | Dobreski . | |
| 4,536,549 | 8/1985 | Hattori et al. . | |
| 4,542,188 | 9/1985 | van der Heijden . | |
| 4,588,650 | 5/1986 | Mientus et al. . | |
| 4,597,920 | 7/1986 | Golike . | |
| 4,624,991 | 11/1986 | Haas . | |
| 4,692,496 | 9/1987 | Bahl et al. . | |
| 4,822,855 | 4/1989 | Kobayashi et al. . | |
| 4,851,478 | 7/1989 | Su . | |
| 4,861,834 | 8/1989 | Audureau et al. . | |
| 4,871,813 | 10/1989 | Senez . | |
| 4,929,681 | 5/1990 | Bahl et al. . | |
| 4,985,498 | 1/1991 | Shirodkar . | |
| 5,041,491 | 8/1991 | Turke et al. . | |
| 5,047,468 | 9/1991 | Lee et al. . | |
| 5,051,481 | 9/1991 | Taka et al. . | |
| 5,085,927 | 2/1992 | Dohrer . | |
| 5,087,667 | 2/1992 | Hwo . | |
| 5,110,870 | 5/1992 | Fujii et al. . | |
| 5,114,763 | 5/1992 | Brant et al. . | |
| 5,126,398 | 6/1992 | Lee et al. . | |
| 5,126,408 | 6/1992 | Rifi . | |
| 5,147,936 | 9/1992 | Peszkin et al. . | |
| 5,212,246 | 5/1993 | Ogale . | |
| 5,218,046 | 6/1993 | Audureau et al. . | |
| 5,254,617 | 10/1993 | Isoue et al. . | |
| 5,262,228 | 11/1993 | Kobyama et al. . | |
| 5,328,734 | 7/1994 | Morese-Seguela et al. . | |
| 5,334,428 | 8/1994 | Dobreski et al. . | |
| 5,344,714 | 9/1994 | Su . | |
| 5,358,792 | 10/1994 | Mehta . | |
| 5,374,677 | 12/1994 | Nishio et al. . | |
| 5,378,764 | 1/1995 | Benham et al. . | |
| 5,397,843 | 3/1995 | Lakshmanan et al. . | |
| 5,407,732 | 4/1995 | Dokumo . | |
| 5,455,303 | 10/1995 | Panagopoulos, Jr. et al. ........... | 525/95 |
| 5,464,905 | 11/1995 | Tsutsui et al. . | |
| 5,478,890 | 12/1995 | Shinozaki et al. . | |
| 5,489,478 | 2/1996 | Audry et al. . | |
| 5,561,195 | 10/1996 | Govoni et al. . | |
| 5,569,693 | 10/1996 | Doshi et al. . | |
| 5,631,069 | 5/1997 | Wooster . | |
| 5,635,262 | 6/1997 | Best . | |
| 5,654,051 | 8/1997 | Andersson et al. . | |
| 5,656,374 | 8/1997 | Marzola et al. . | |

OTHER PUBLICATIONS

Research Disclosure, Jun. 1992, 33875, Amorphous Polyolefins as Tack Additives for Polyethylene Blown and Cast Film.

*Primary Examiner*—David W. Wu
*Assistant Examiner*—Ling-Siu Choi
*Attorney, Agent, or Firm*—Johnathan D. Wood; Harry J. Gwinnell

[57] ABSTRACT

The present invention relates to a monolayer film formed from a composition comprising from about 90 weight percent to about 99 weight percent based on the total weight of the composition of a component selected from a homopolymer of ethylene; an ethylene alpha olefin copolymer; an ethylene vinyl acetate copolymer; and mixtures thereof; wherein the component has a density no greater than 0.94 g/cc; and from about 1 weight percent to about 10 weight percent based on the total weight of the composition of a copolymer of propylene with a monomer copolymerizable therewith, having a viscosity of between about 1 and about 2000 cP at 190 degrees C., and a needle penetration of about 50 dmm to about 150 dmm at 23 degrees C., wherein the monomer comprises from about 10 weight percent to about 40 weight percent of the total weight of the propylene copolymer. The monolayer films of the present invention are particularly well suited for use as a stretch film.

16 Claims, No Drawings

MONOLAYER FILM

CROSS-REFERENCE TO RELATED APPLICATION

This application claims priority under 35 U.S.C. Section 119(e) to U.S. provisional application Ser. No. 60/050,768, filed Jun. 25, 1997. The present application is related to co-pending U.S. application Ser. Nos. 09/145,629, U.S. Pat. No. 6,070,394 09/145,452, 09/145,451, and 09/145,684.

FIELD OF THE INVENTION

The present invention is directed to a monolayer polymeric film. More particularly, the present invention is directed to a monolayer polymeric film particularly suited for use as a stretch film.

BACKGROUND OF INVENTION

Polyethylene containing compositions have been used to prepare a wide variety of films. It is often desirable for such films to have cling properties, especially when used for such purposes as stretch wrap films. Hence, cling additives are commonly added to the polyethylene containing compositions to provide the film with the desired cling properties.

Unfortunately, it is well known that the addition of cling additives to polyethylene increases the noise level associated with unwinding a roll of film. Moreover, one of ordinary skill in the art would expect the unwinding noise of the film to increase as the level of the cling additive increases.

It is therefore apparent that there is a need for a polyethylene film composition having increased cling properties that does not exhibit the general increase in the level of noise when unwinding the roll of film.

SUMMARY OF THE INVENTION

The present invention relates to a monolayer film formed from a composition comprising from about 90 weight percent to about 99 weight percent based on the total weight of the composition of a component selected from a homopolymer of ethylene; an ethylene alpha olefin copolymer; an ethylene vinyl acetate copolymer; and mixtures thereof; wherein the component has a density no greater than 0.94 g/cc; and from about 1 weight percent to about 10 weight percent based on the total weight of the composition of a copolymer of propylene with a monomer copolymerizable therewith, having a viscosity of from about 1 to about 2000 cP at 190 degrees C., and a needle penetration of from about 50 dmm to about 150 dmm at 23 degrees C., wherein the monomer comprises from about 10 to about 40 weight percent of the total weight of the propylene copolymer.

An advantage of the monolayer film of the present invention is that the film provides enhanced cling properties without adversely affecting the unwinding noise levels of the film, making the monolayer films particularly well suited for use as stretch films.

These and other features, and advantages of the present invention will become more fully apparent from the following description and appended claims, or may be learned by the practice of the of the invention as set forth hereinafter.

DETAILED DESCRIPTION OF THE INVENTION

The monolayer film of this invention is formed from a composition comprising at least two components, an ethylene containing polymeric material and a propylene copolymer. The two components are described in further detail as follows:

The ethylene containing polymeric component is a homopolymer of ethylene or a copolymer of ethylene with a comonomer copolymerizable therewith. More particularly, the ethylene containing polymeric component is selected from a homopolymer of ethylene; an ethylene alpha olefin copolymer; an ethylene vinyl acetate copolymer; and mixtures thereof, wherein the component has a density no greater than 0.94 g/cc. The ethylene containing polymeric component preferably has a density of from about 0.88 to about 0.93 g/cc, and more preferably from about 0.89 to about 0.92 g/cc.

The alpha olefin copolymer of the ethylene alpha olefin copolymer preferably has from 3 to 20 carbon atoms per molecule and is present in an amount from about 2 to about 20 weight percent based on the ethylene alpha olefin copolymer. Examples of the alpha olefin copolymer include 1-butene, 1-pentene, 4-methyl-1-pentene, 1-hexene, 1-octene, 1-nonene, 1-decene, 1-dodecene, a terpolymer of ethylene, a terpolymer of 1-butene, a terpolymer of 1-hexene, and mixtures and derivatives thereof. In a preferred embodiment, the alpha olefin is selected from 1-butene, 1-hexene and 1-octene.

The ethylene containing polymeric component may be readily prepared by any conventional technique known in the art.

The propylene copolymer component of the composition herein is a copolymer of propylene with a monomer copolymerizable therewith. The propylene copolymer component of the composition preferably includes an alpha olefin as the monomer having from about 2 to about 12 carbon atoms per molecule. More preferably the alpha olefin monomer is ethylene.

The propylene copolymer component has a viscosity of from about 1 to about 2000 cP at 190 degrees C., preferably from about 1 to about 1000 cP, more preferably from about 150 to about 350 cP, and most preferably about 250 cP.

The propylene copolymer component has a needle penetration in a range of from about 50 dmm to about 150 dmm at 23 degrees C., preferably from about 75 to about 125 dmm, more preferably from about 80 to about 120 dmm, and most preferably 100 dmm.

The monomer is present in the propylene copolymer component in an amount from about 10 weight percent to about 40 weight percent of the total weight of the propylene copolymer, preferably in an amount from about 15 weight percent to about 30 weight percent, more preferably from about 16 weight percent to about 22 weight percent, and most preferably from about 18 weight percent to about 20 weight percent.

The propylene copolymer component of the composition utilized herein may be produced by a process disclosed in Canadian Patent 1,296,484, entitled "Process for the Direct Synthesis of Highly Amorphous Propylene Homopolymers and Propylene-Ethylene Copolymers". Propylene copolymer components within the scope of the present invention may also be purchased from Eastman Chemical Company, Kingsport, Tenn. under the Eastman Chemical Company Trademark EASTOFLEX E1003.

In accordance with the present invention, there is provided a polymeric composition comprising (a) from about 90 to about 99 weight percent of the ethylene containing polymeric component defined hereinabove, and (b) from about 1 to about 10 weight percent of the propylene copolymer component defined hereinabove, wherein the weight percents are based on the weight of the blend composition. The exact amounts of each component are determined by the application for which the film is to be employed. Variation of the amounts of each component is within the scope of one skilled in the art.

For many purposes, it may be desirable to incorporate other conventional additives with the blend compositions of the present invention. For example, there may be added antioxidants, heat and light stabilizers, dyes, antistatic agents, preservatives, processing aids, pigments, flame retardants, and the like.

The composition of the ethylene containing polymeric component and the propylene copolymer component defined hereinabove is readily prepared by any method known in the art. For example, the components of the composition may be blended together by melt extrusion or may be admixed together on a conventional mixing machine such as an extruder or a continuous mixer.

The compositions of the present invention may be fabricated or formed into monolayer films by any technique known in the art, and are particularly suitable for use with blown-film techniques and cast film techniques. For example, when utilizing a blown film technique for producing the film, the following procedure may be employed. A composition as defined hereinabove is introduced into the feed hopper of a 63.5 mm Egan extruder that is water-cooled, resistance heated and has an L/D ratio of 24:1. The film was produced using a 15.24 cm Sano die with a 2.24 mm die gap, along with a Sano dual orifice nonrotating, nonadjustable air ring. The film is extruded through the die into a film that is cooled by blowing air onto the surface of the film in a blowing manner. The film is drawn from the die typically forming a cylindrical film that is cooled, collapsed, optionally slit, and wound to form a roll of monolayer film.

In preparing cast films from the compositions described hereinabove, any of the well known cast film forming procedures may be utilized.

The invention will be more readily understood by reference to the following examples. There are, of course, many other forms of the invention which will become obvious to one skilled in the art, once the invention has been fully disclosed, and it will accordingly be recognized that these examples are given for the purpose of illustration only, and are not to be construed as limiting the scope of this invention in any way.

EXAMPLES

The following test procedures were used in evaluating the analytical properties of the compositions herein and in evaluating the physical properties of the monolayer films of the examples.

Cling values are obtained in accordance with ASTM D5458-95 entitled "Standard Test Method for Peal Cling of Stretch Wrap Film."

Noise level in decibels, dB, is measured as follows. A monolayer film roll is cut to 51 cm in width and placed on a prestretch pallet wrapping maching of the LANTECH LAN-WRAPPER type. The films are wound onto a pallet load at a film speed of 42 rpm (revolutions per minute). The films are applied to the pallet load in tubular fashion (two plies of film). This was done since the tubular blown film had not been slit. A digital sound meter was used to measure the level of sound generated by the film rolls while wrapping a pallet load using the prestretch pallet wrapping machine. The sound meter was positioned at a point between 46 and 61 cm from the film roll.

Haze—ASTM D1003
Dart—ASTM D1709A
Gloss—ASTM D2457
Tear—ASTM D1922
Puncture—ASTM D4649
Viscosity—ASTM D3236
Needle Penetration—ASTM at 23 degrees C.

Examples 1–2

In these examples, there is shown the comparison of a film prepared from an LLDPE polymeric component without added propylene copolymer and a film prepared from a composition comprising 90% by weight of the same LLDPE and 10% by weight propylene-ethylene copolymer containing about 18% by weight ethylene units, based on the copolymer, the copolymer having a viscosity of approximately 250 Mpa's at 190° C., and a needle penetration of about 100 dmm at 23° C. The LLDPE used in these examples was a linear low density polyethylene comprising an ethylene-octene copolymer. The copolymer had a melt index of about 0.9 grams per ten (10) minutes at 190° C. and a density of about 0.920 grams per cubic centimeter. The composition, from which the film was prepared herein, was prepared by dry blending 90% by weight of the LLDPE described hereinabove and 10% by weight of the propylene copolymer described herein, followed by extruding in a film extruder as described above. The propylene copolymer was provided as a blend of 40% by weight of the propylene-ethylene copolymer herein and 60% by weight of the LLDPE described hereinabove, dusted with 5% of MICROTHENE low density polyethylene micronized powder, produced and sold by Quantum Chemical. The blend is then "let down" from about 40% by weight to about 10 percent by weight of the propylene copolymer.

A blown film was produced from the composition of the LLDPE and propylene-ethylene copolymer described above utilizing the procedure described hereinabove for producing a blown film. The results are shown in Table I.

TABLE I

| Example No. | Example 1<br>100% LLDPE | Example 2<br>90% LLDPE<br>10% Propylene-ethylene<br>copolymer |
|---|---|---|
| Cling 0% Elong., Initial | 0 | 246 |
| Cling 0% Elong., 2 weeks | 0 | 405 |
| Cling 200% Elong., Initial | 0 | 212 |
| Cling 200% Elong., 2 weeks | 0 | 316 |
| Noise Level, dB | 77 | 77 |
| Dart, g | 220 | 139 |
| Haze, % | 4.7 | 2.1 |
| Gloss, % | 69.2 | 82 |
| Tear-MD, g | 392 | 274 |
| Tear-TD, g | 858 | 1134 |
| Puncture, inch-pound | 55.109 | 61.377 |

From the above data in Table I, it is apparent that the film produced from a composition of LLDPE and propylene-ethylene copolymer herein has increased cling values as compared to film produced from 100% LLDPE. This is shown to occur at both 0% elongation and, more importantly, at 200% elongation. Moreover, as is further evident from the data, the increase in cling value was achieved with no accompanying increase in noise level. This is completely unexpected in that the prior art, as typified by U.S. Pat. No. 5,273,809, at Column 5, lines 17–31, states that the incorporation of additives to enhance cling adversely affect the unwind noise level of films produced therefrom. Accordingly, the monolayer films of the invention, as shown in the examples, are characterized by properties that are both advantageous and contrary to the teachings of the prior art.

Example 3

LLDPE film formed from ethylene-hexene or ethylene-octene, containing polybutene exhibits an unwinding noise greater than 85 decibels under the conditions disclosed above. In contrast, an LLDPE film formed from ethylene-hexene or ethylene-octene blended with an ethylene-propylene copolymer within the scope of the present invention would be expected to exhibit an unwinding noise less than about 80 decibels.

From the above it is clear that the use of the specific propylene-ethylene copolymers allow cling to be increased in monolayer films prepared using a blown film process without adversely affecting the unwinding noise level of the film.

What is claimed is:

1. A monolayer film formed from a composition comprising:
   (a) from about 90 weight percent to about 99 weight percent based on the total weight of the composition of a component selected from the group consisting of a homopolymer of ethylene; an ethylene alpha olefin copolymer, an ethylene vinyl acetate copolymer; and mixtures thereof; wherein the component has a density no greater than 0.94 g/cc; and
   (b) from about 1 weight percent to about 10 weight percent of a copolymer of propylene with a monomer copolymerizable therewith, having a viscosity of between about 1 and about 2000 cP at 190 degrees C., and a needle penetration of about 50 dmm to about 150 dmm at 23 degrees C., wherein the monomer comprises from about 10 weight percent to about 40 weight percent of the total weight of the propylene copolymer.

2. A monolayer film as recited in claim 1, wherein the alpha olefin comonomer has from 3 to 20 carbon atoms per molecule and is present in an amount of from about 2 to about 20 weight percent based on the ethylene alpha olefin copolymer.

3. A monolayer film as recited in claim 1, wherein the component has a density of from about 0.88 to about 0.93 g/cc.

4. A monolayer film as recited in claim 1, wherein the component has a density of from about 0.89 to about 0.92 g/cc.

5. A monolayer film as recited in claim 1, wherein the alpha olefin is selected from the group consisting of 1-butene, 1-pentene, 4-methyl-1pentene, 1-hexene, 1-heptene, 1-octene, 1-nonene, 1-decene, and 1-dodecene, and mixtures and derivatives thereof.

6. A monolayer film as recited in claim 1, wherein the alpha olefin is selected from 1-butene, 1-hexene, 1-heptene and 1-octene.

7. A monolayer film as recited in claim 1, wherein the monomer is an alpha olefin having from about 2 to about 12 carbon atoms per molecule.

8. A monolayer film as recited in claim 1, wherein the monomer is ethylene.

9. A monolayer film as recited in claim 1, wherein the propylene copolymer has a viscosity in a range of from about 1 to about 1000 cP, a needle penetration in a range of from about 75 to about 125 dmm, and wherein the monomer comprises from about 15 to about 30 weight percent based on the weight of the propylene copolymer.

10. A monolayer film as recited in claim 1, wherein the propylene copolymer has a viscosity in a range of from about 150 to about 350 cP, a needle penetration in a range of from about 80 to about 120 dmm, and wherein the monomer comprises an ethylene content in a range of from about 16 to about 22 weight percent based on the weight of the propylene copolymer.

11. A monolayer film as recited in claim 1, wherein the propylene copolymer has a viscosity of about 250 cP, a needle penetration of about 100 dmm, and wherein the monomer comprises an ethylene content of from about 18 to about 20 weight percent based on the weight of the propylene copolymer.

12. A monolayer film as recited in claim 1, wherein the monolayer film is a blown film.

13. A monolayer film as recited in claim 1, wherein the monolayer film is a cast film.

14. A monolayer film as recited in claim 1, wherein the monolayer film is a stretch wrap film.

15. A monolayer film formed from a composition comprising:
   (a) from about 90 weight percent to about 99 weight percent based on the total weight of the composition of a homopolymer of ethylene having a density of from about 0.88 to about 0.92 g/cc; and
   (b) from about 1 weight percent to about 10 weight percent of a propylene-ethylene copolymer having a viscosity of about 250 cP at 190 degrees C., and a needle penetration of about 100 dmm at 23 degrees C., and wherein the ethylene comprises from about 18 weight percent to about 20 weight percent of the total weight of the propylene-ethylene copolymer.

16. A monolayer film as recited in claim 1, wherein the ethylene alpha olefin copolymer is selected from the group consisting of ethylene-hexene and ethylene-octene.

* * * * *